United States Patent
Paulsen et al.

(10) Patent No.: US 11,376,613 B2
(45) Date of Patent: Jul. 5, 2022

(54) SPRAY NOZZLE ASSEMBLY WITH EXPANDED PRESSURE RESPONSIVE LIQUID FLOW RATE CONTROL

(71) Applicant: Spraying Systems Co., Wheaton, IL (US)

(72) Inventors: Gary A. Paulsen, Batavia, IL (US); Kari Kavanagh, Winfield, IL (US)

(73) Assignee: Spraying Systems Co., Wheaton, IL (US)

( * ) Notice: Subject to any disclaimer, the term of this patent is extended or adjusted under 35 U.S.C. 154(b) by 142 days.

(21) Appl. No.: 15/563,833

(22) PCT Filed: Mar. 31, 2016

(86) PCT No.: PCT/US2016/025201
§ 371 (c)(1),
(2) Date: Oct. 2, 2017

(87) PCT Pub. No.: WO2016/161079
PCT Pub. Date: Oct. 6, 2016

(65) Prior Publication Data
US 2018/0078955 A1      Mar. 22, 2018

Related U.S. Application Data

(60) Provisional application No. 62/141,472, filed on Apr. 1, 2015.

(51) Int. Cl.
*B05B 1/30* (2006.01)
*A01G 25/09* (2006.01)
(Continued)

(52) U.S. Cl.
CPC .......... *B05B 1/3006* (2013.01); *A01C 23/047* (2013.01); *A01G 25/09* (2013.01);
(Continued)

(58) Field of Classification Search
CPC ......... B05B 1/3006; B05B 1/20; B05B 1/202; B05B 1/02; B05B 3/02; A01M 7/0014; A01M 7/0042; A01M 7/006
(Continued)

(56) References Cited

U.S. PATENT DOCUMENTS 2,585,509 A * 2/1952 Smith ................. B05B 1/323
239/602
4,448,669 A * 5/1984 Scinta ................. C10G 1/04
208/415
(Continued)

*Primary Examiner* — Steven M Cernoch
*Assistant Examiner* — Christopher R Dandridge
(74) *Attorney, Agent, or Firm* — Leydig, Voit & Mayer Ltd.

(57) ABSTRACT

An agricultural sprayer having a liquid supply conduit for directing selectively controllable pressurized liquid to a plurality of spray nozzle assemblies. Each nozzle assembly includes a nozzle body having a respective orifice member having an inwardly tapered conical section communicating with a smaller diameter discharge orifice. Each respective orifice member is made of a resilient and pressure responsive deformable material such that upon an increase in the pressure of the liquid supply said liquid flow passage and discharge orifice thereof can be altered to increase the rate through said orifice member and nozzle body by at least 75 percent and upon interruption of the supply of pressurized liquid to the orifice member the orifice member liquid flow passage and discharge orifice return to their original shape.

17 Claims, 14 Drawing Sheets

(51) Int. Cl.
*A01C 23/04* (2006.01)
*B05B 1/02* (2006.01)
*B05B 1/20* (2006.01)
*A01M 7/00* (2006.01)
*B05B 15/658* (2018.01)

(52) U.S. Cl.
CPC .............. *A01M 7/0014* (2013.01); *B05B 1/02* (2013.01); *B05B 1/20* (2013.01); *B05B 1/202* (2013.01); *B05B 15/658* (2018.02)

(58) Field of Classification Search
USPC ......................................................... 239/728
See application file for complete search history.

(56) References Cited

U.S. PATENT DOCUMENTS

| | | | | |
|---|---|---|---|---|
| 4,449,669 | A * | 5/1984 | Mehoudar | B05B 1/3006 239/533.1 |
| 5,190,222 | A * | 3/1993 | Haruch | B05B 1/267 239/524 |
| 2009/0321543 | A1 * | 12/2009 | Lawyer | B05B 15/65 239/600 |
| 2012/0118998 | A1 * | 5/2012 | Drechsel | B05B 1/3006 239/533.1 |
| 2014/0151461 | A1 * | 6/2014 | Sasaki | B05B 17/0684 239/102.2 |

* cited by examiner

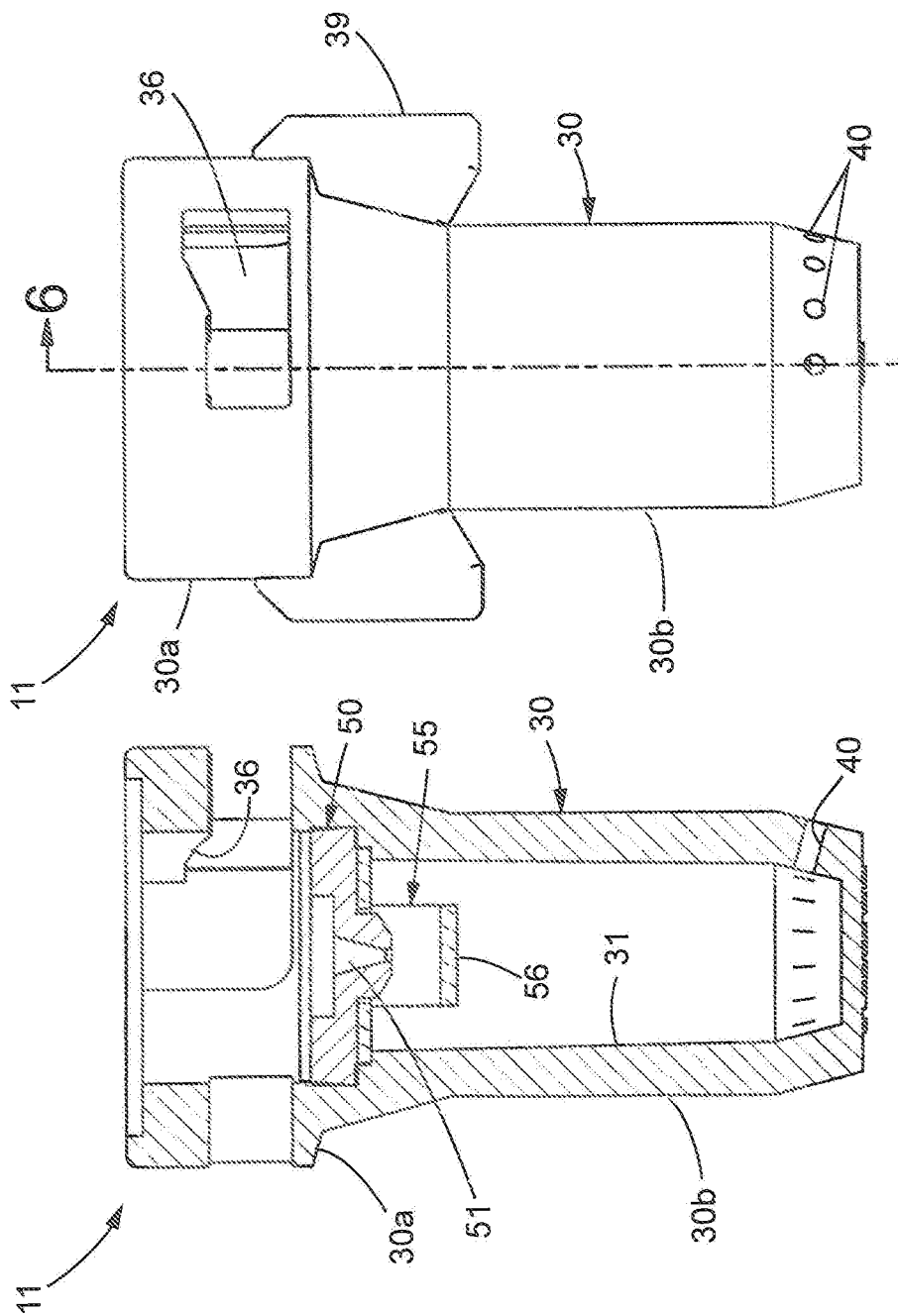

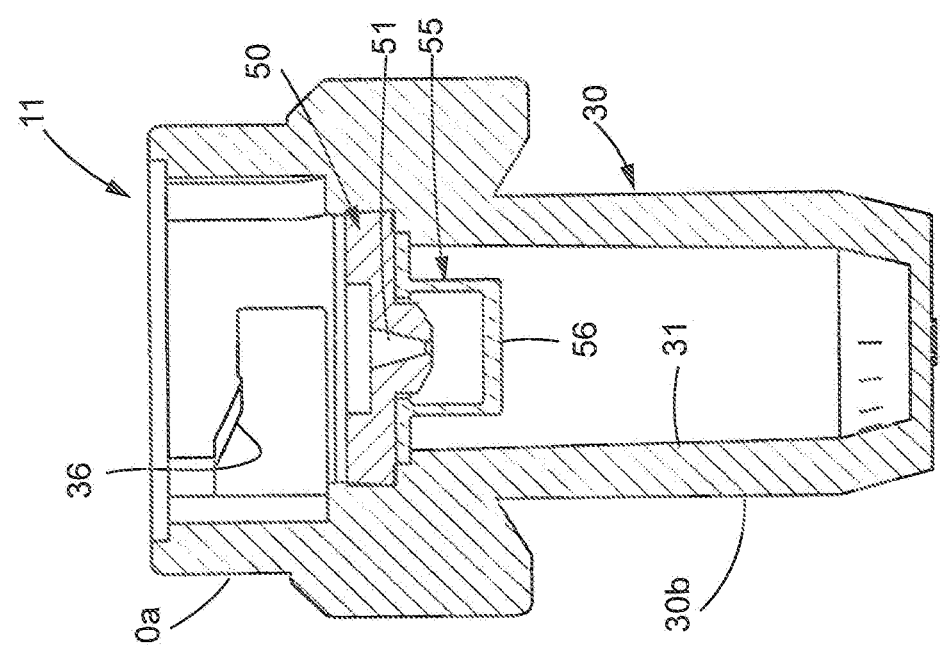
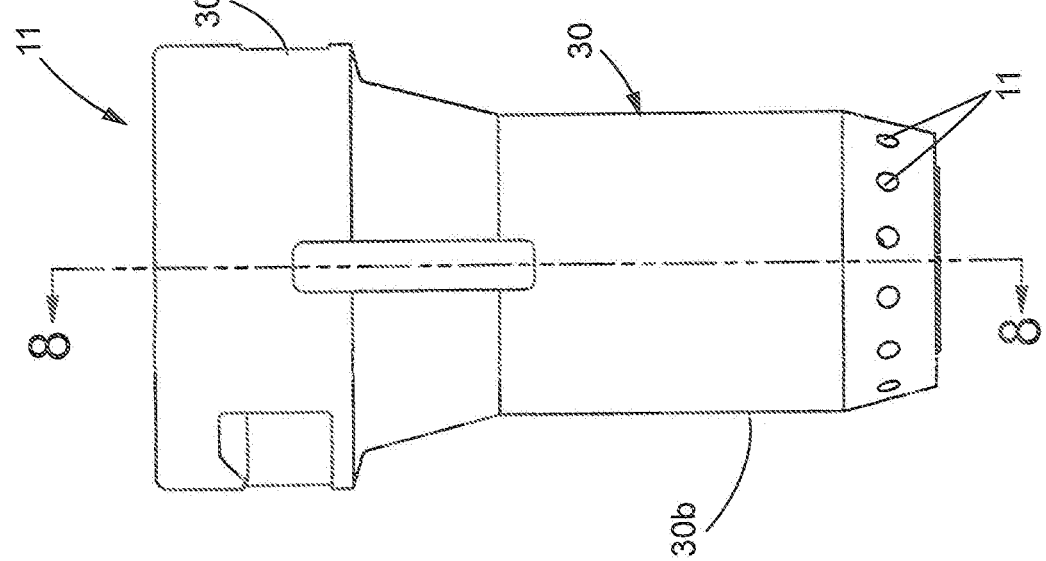
FIG. 8
FIG. 7

SPRAY NOZZLE ASSEMBLY WITH EXPANDED PRESSURE RESPONSIVE LIQUID FLOW RATE CONTROL

CROSS-REFERENCE TO RELATED APPLICATION

This patent application claims the benefit of U.S. Provisional Patent Application No. 62/141,472, filed Apr. 1, 2015, which is incorporated by reference.

FIELD OF THE INVENTION

The present invention relates generally to liquid spray nozzle assemblies, and more particularly, to spray nozzle assemblies having particular utility in spraying agricultural chemicals, such as fertilizers, pesticides, and the like.

BACKGROUND OF THE INVENTION

It is common practice to spray agricultural chemicals from relatively large tractor pulled spray booms, spanning over 100 feet in length. Such spray booms include large numbers of individual spray nozzles, laterally spaced along the length of the boom each for directing an individual spray discharge of the chemical as the boom is transported through a field.

Such agricultural sprayers now often employ relatively sophisticated GPS control based systems for monitoring and controlling the liquid flow to each spray nozzle and for mapping the quantity of chemicals sprayed through a field. In such systems, it is possible to control and monitor the spraying of different quantities of liquid chemicals at different locations in the field, such as along edge rows or reapplication of sprayed areas. The quantity of liquid sprayed can also be controlled according to the travel speed of the spray boom. It further is necessary to direct different quantities of liquid in conjunction with specific seed planting requirements, and it is similarly desirable to change the liquid distribution rate according to changes in planting speed.

The flow rate through the spray nozzles typically is increased or decreased by altering the pressure of the feed liquid. The range of variation in flow rate by this technique, however, is limited. Hence, to increase the flow rate of the nozzles significantly, it is necessary to change to spray tip of each of the nozzles on the spray boom, which is time consuming as well as requiring an inventory of alternatively sized spray tips, which is expensive. While proposals have been made for altering the flow rate and spray discharge without replacement of the spray tip, such proposals have been relatively complex, unreliable in operation, and relatively expensive.

OBJECTS AND SUMMARY OF THE INVENTION

It is an object of the present invention to provide a spray nozzle assembly adapted for enabling a substantial increase and decrease in the flow rate of the discharging spray without changing the spray tip of the spray nozzle assembly.

Another object is to provide a spray nozzle assembly as characterized above that is operable for significantly changing the liquid flow rate and spray discharge output solely by changing the pressure of the supply liquid.

A further object is to provide a spray nozzle assembly of the above kind that has particular utility in directing selected variable quantities of agricultural chemicals, including liquid fertilizers used in conjunction with agricultural seed planting.

Still another object is to provide a spray nozzle assembly of such type that is relatively simple in construction and lends itself to economical manufacture.

Other objects and advantages of the invention will become apparent upon reading the following detailed description and upon reference to the drawings, in which:

BRIEF DESCRIPTION OF THE DRAWINGS

FIG. 5 is a front plan view of the illustrated spray nozzle assembly;

FIG. 6 is a vertical section of the illustrated spray nozzle assembly taken in the plane of line 6-6 in FIG. 5;

FIG. 7 is a side plan view of the illustrated spray nozzle assembly;

FIG. 8 is a vertical section of the spray nozzle assembly taken in the plane of line 8-8 in FIG. 7;

Figure 1:
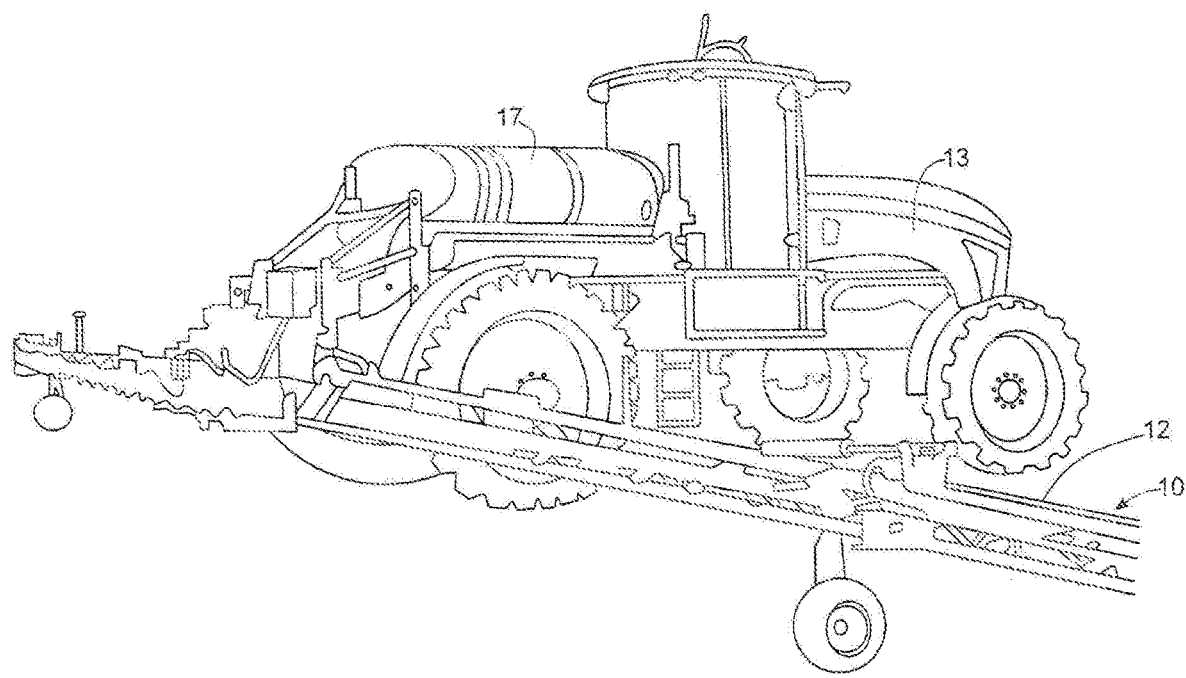
FIG. 1 is a perspective of an illustrative spray boom having spray nozzle assemblies in accordance with the invention being pulled by a motorized tractor.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DESCRIPTION OF THE PREFERRED EMBODIMENTS

Figure 2:
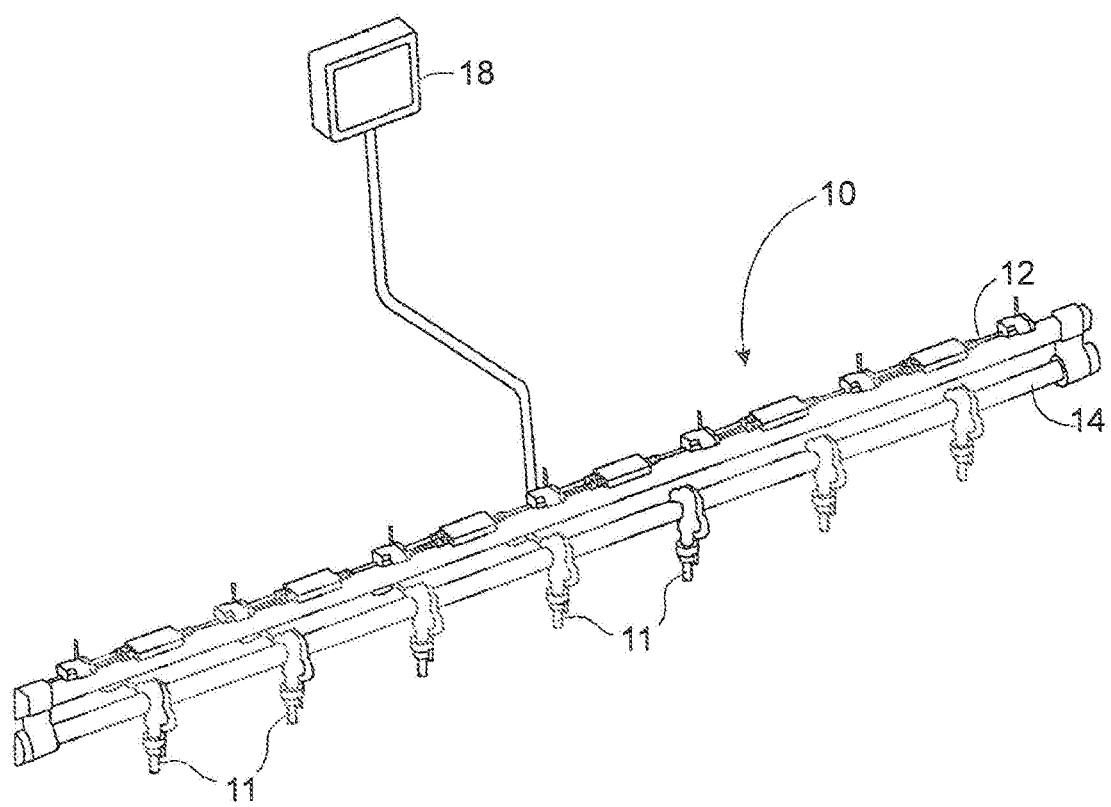
FIG. 2 is an enlarged perspective of a section of the spray boom shown in FIG. 1.

Referring now more particularly to FIGS. 1 and 2 of the drawings, there is shown an illustrative spray boom 10 having a plurality of liquid spray nozzle assemblies 11 for spraying chemicals or other liquids onto a field along strips corresponding to the width of the spray boom 10 as it is being pulled by a tractor 13 or the like. The spray boom 10 in this case includes a laterally extending support member 12 which carries a liquid supply conduit 14 coupled to a liquid supply tank 17 carried the tractor 13. As is known in the art, suitable pumps and control or throttling valves operable for a control 18 are provided for controlling the pressure, and hence flow rates, of liquid to the spray nozzle assemblies 11.

Figure 3:
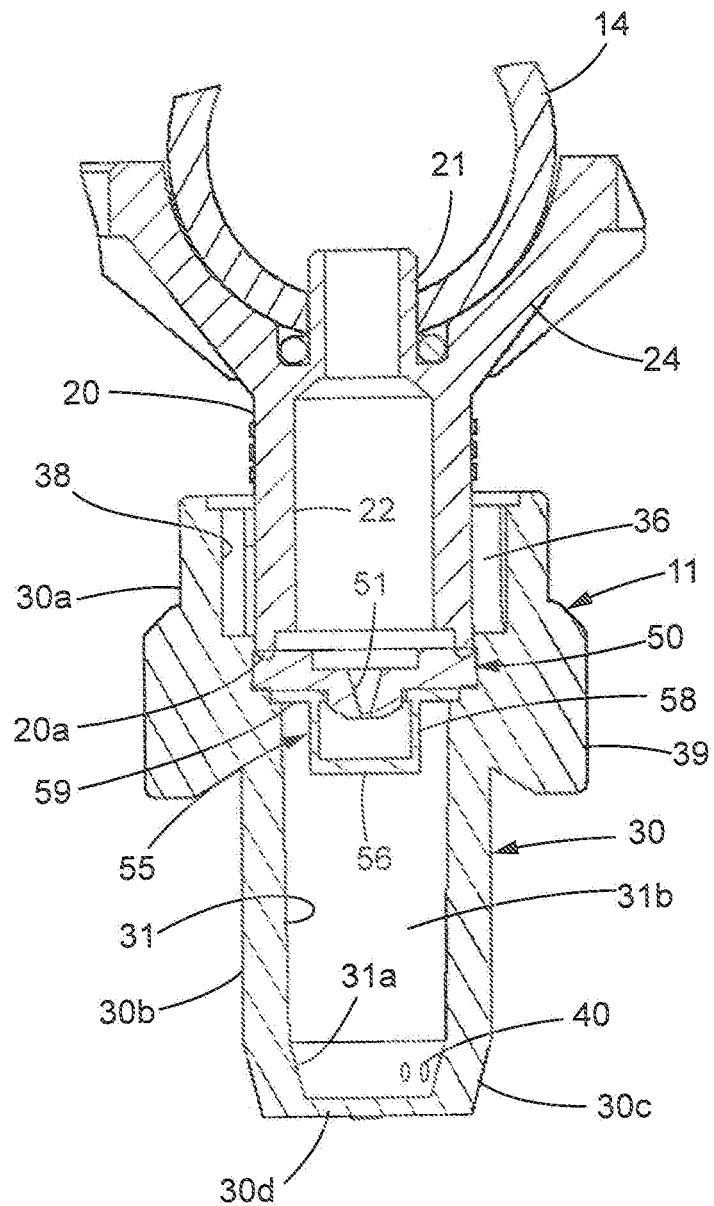
FIG. 3 is an enlarged vertical section of one of the spray nozzle assemblies in accordance with the invention supported in depending fashion form a liquid supply conduit of the spray boom.
Figure 4:
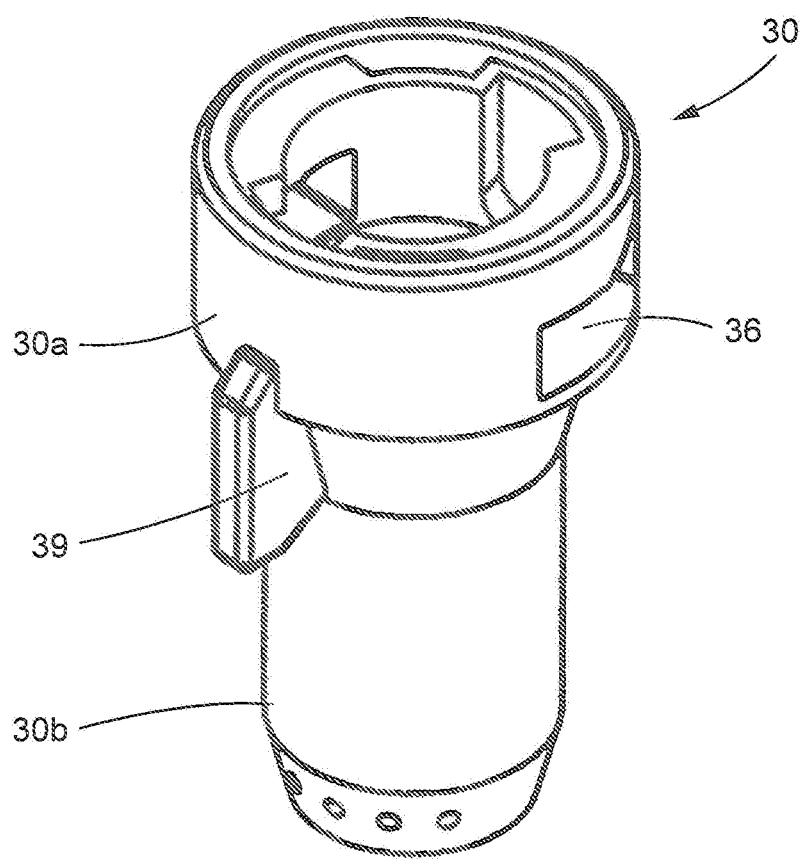
FIG. 4 is an enlarged perspective of the illustrated spray nozzle assembly.

The spray nozzle assemblies 11 each is supported in depending fashion from the liquid supply conduit 14 by a respective mounting and liquid supply stem 20 as depicted in FIG. 3. Each stem 20 has a nipple 21 which extends into the supply conduit 14 through an aperture in an underside thereof. Pressurized liquid within the conduit 14 enters the nipple 21 and passes downwardly through a central passageway 22 in the stem 20 communicating with a spray nozzle assembly 11. For securing the stem 20 to the conduit 14, the top of the stem 20 in this case forms a first clamping element 24 positioned around a bottom half of the conduit 14 and cooperates with a second clamping element (not shown) which surround and clamps the opposite side of the conduit in a conventional manner, such as shown in U.S. Pat. No. 4,527,745 assigned to the same applicant as the present invention, the disclosure of which is incorporated herein by reference.

The illustrated spray nozzle assemblies 11, as best depicted in FIGS. 3-8, each comprise a generally cylindrical body 30 which defines a central passage 31 and includes an upstream mounting and liquid inlet section 30a and a downstream liquid discharge section 30b. For releasably connecting the nozzle body 30 to the mounting and liquid inlet stem 20, the stem 20 has diametrically opposed radial camming and locking lugs for cooperation within camming and locking grooves 36 within the mounting section 30a of the nozzle body 30 for enabling quick disconnect coupling and uncoupling of the nozzle body 30 with the stem 20 as an incident to relative rotation of the nozzle body 30, as disclosed in the aforementioned referenced U.S. Pat. No. 4,527,745. The mounting section 30a of the nozzle body 30 is formed with outwardly extending radial wings 39 to facilitate rotation of the nozzle body 30 during mounting and disassembly of the nozzle body 30 from the stem 20.

The downstream liquid discharge section 30b of the illustrated nozzle body 30 is cylindrical in shape with a downstream frustoconical end 30c and a closed transverse bottom wall 30d. The frustoconical end 30c defines and inwardly tapered frustoconical end 31a of the central passage 31. The frustoconical section 31a in this instance is formed with a plurality of circumferentially spaced discharge orifices 40 for directing liquid spray streams in an outwardly expanding conical pattern. The discharge orifices 40 in this case are seven in number and are disposed in an arc of about 150 degrees on one side of the nozzle body. Alternatively the discharge orifices 40 could be formed about the entire circumference of the nozzle body 30, or instead, in a bottom wall 30d of the nozzle body 30 for discharging the liquid spray pattern directly in a downward pattern.

To facilitate atomization and direction of liquid directed through the nozzle body 30, an orifice member or spray tip 50 is mounted adjacent an upstream end of a cylindrical section of the central nozzle body passage 31 which defines a downstream expansion chamber 31b communicating with the discharge orifices 40. The orifice member 50 in this case is annular in shape and has a centrally disposed liquid passageway 51 with a downstream discharge orifice 52 for accelerating and directing liquid communicated to the nozzle body 30 into the expansion chamber 31b.

For deflecting and redistributing the liquid flow stream discharging from the orifice member 50, an impingement element 55 is provided which has an impingement plate 56 disposed in spaced apart opposed downstream relation to the discharge orifice 52 of the orifice member 50. The impingement plate 56 in this case is defined by a central plate of a U-shaped member having legs 58 extending in downstream relation to an annular mounting plate 59. The annular mounting plate 59 of the impingement element 55 is supported with a peripheral edge portion fixed between a downstream side of the orifice member 50 and a smaller diameter counter bore within the nozzle body 30 (FIG. 3).

Figure 10:
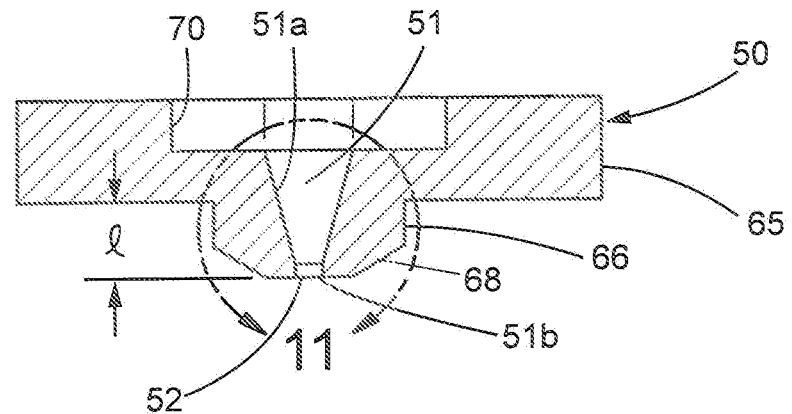
FIG. 10 is an enlarged vertical section of the orifice member of the illustrated spray nozzle assembly.
Figure 11:
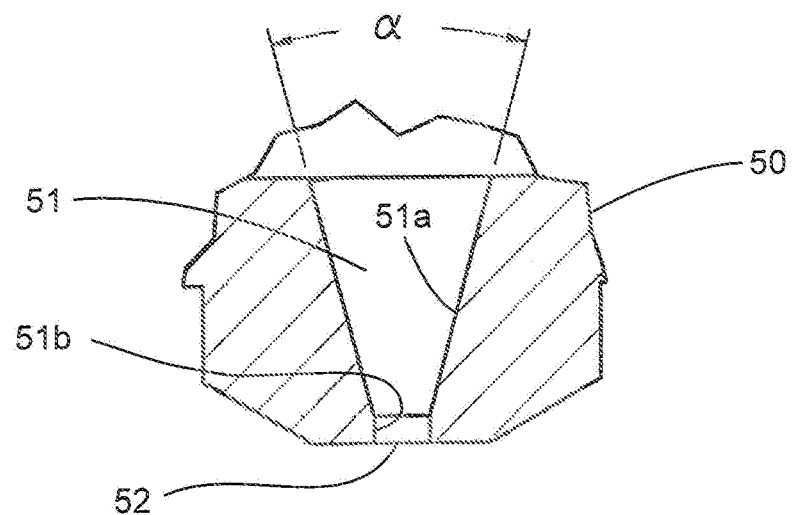
FIG. 11 is an enlarged section of the orifice member taken in the circular area depicted in FIG. 10.

In accordance with an important feature of the present embodiment, the orifice member 50 is made of a resilient material such that the liquid flow passage 51 and discharge orifice 52 thereof are altered in response to a change in pressure of liquid directed through the nozzle assembly 11 for enabling a substantially greater pressure responsive range of flow rates through the orifice member 50 as compared to orifice members and spray tips with fixed diameter discharge orifices. The illustrative orifice member 50, as best depicted in FIGS. 10 and 11, basically comprises an upstream cylindrical section 65 and a smaller diameter hub 66 protruding from a downstream side thereof having an inwardly tapered frustoconical end 68. The hub 66 in this case is about ⅓ the diameter of the upstream cylindrical section 65 and extends an axial length l about ¾ of the axial thickness of the upstream cylindrical section 65. The tapered frustoconical end 68 in this case has an axial length less than ½ the axial length of the hub 66, in this case about ⅔ of the axial length of the hub. The upstream cylindrical section 65 has a relatively large diameter liquid entry passageway 70 communicating with the central liquid passage 51. The entry passageway 70 in this case is in the form of a counter bore in an upstream side of the orifice member 50 having the diameter of about ½ the diameter of the upstream cylindrical section 65 and an axial depth of about ½ the thickness of the upstream cylindrical section 65. The central passage 51 is defined by an inwardly tapered passage section 51a which communicates with a short length cylindrical section 51b that defines the discharge orifice 52 of the orifice member.

In keeping with this embodiment, the orifice member 50 is made of a deformable resilient material that enables controlled alteration of the central passage 51 and discharge orifice 52 in response to changes in pressure of the supply liquid to the spray nozzle assembly 11. By way of example, the orifice member 50 may be made of an elastomeric material, such as ethylene propylene rubber ("EPR"), fluorocarbon rubber (e.g. Viron® fluorocarbon), or other rubber or elastomeric materials, or combinations thereof. The material must (1) be deformable in a predictable manner under pressures encountered during normal agricultural spraying applications, such as pressures in the 20-60 psi range, and (2) enable the orifice member 50 to return to its original shape when the liquid supply is interrupted and the pressure load is removed. The material should enable deformation of the orifice member and discharge orifice thereof such that as an incident to an increase in liquid feed pressure from 20-60 psi, the flow rate through the orifice member and spray nozzle assembly can be predictably increased by at least 75 percent. In the illustrated embodiment, the spray nozzle is made of an EPDM thermoset elastomeric material having a 50 Shore A hardness, and as will become apparent, as an incident to increase in liquid feed pressure from 20-60 psi, the flow rate through the nozzle assembly is increased by at least 130 percent. For purposes herein, orifice members and spray tips with fixed diameter discharge orifices, are orifice members or spray tips do not experience appreciable deformation when subject to liquid pressures, such as 20-60 psi, commonly incurred in agricultural spraying.

It will be appreciated that the resiliency of the orifice member material further enables the orifice member 50 to serve the dual purpose of a sealing gasket. To that end, the downstream terminal end of the mounting stem 20 is in the form or an annular bead 20a (FIG. 3) that engages an outer peripheral portion of the orifice member 50 for tightly clamping the orifice member 50 into sealed relation with both the nozzle body 30 and the impingement element 55 as an incident to rotation of the nozzle body 30 into mounted relation on the stem 20.

In further carrying out this embodiment, the configuration of the central passage 51 and protruding hub 66 of the orifice member 50 contribute to controlled pressure responsive alterations in the orifice member discharge orifice 52 for enabling a wider range of relatively precisely controlled changes in the flow rate proportional to the liquid feed pressure. The inwardly tapered section 51a of the central passage 51 of the orifice member 50 in this case has a frustoconical configuration formed with an angle α of between 20 and 40 degrees, and preferably about 30 degrees. With a 30 degree conical taper, the sides of the conical section taper inwardly in a downstream direction at an angle of about 15 degrees to the central axis of the orifice member. The frustoconical section 51a of the central passage 51, furthermore, extends in part through the upstream cylindrical section 65 of the orifice member 50 and partially through the downstream protruding hub 66. In the illustrated embodiment, about ½ of the frustoconical passage section 51a, namely the upstream half, is disposed within the upstream cylindrical section 65 of the orifice member and about ½ of the frustoconical passage section 51a extends through the smaller diameter hub 66. While the theory of operation is not entirely understood, it is believed that by virtue of the resiliency of the material from which the orifice member 50 is formed and the configuration of the orifice member 50 and its central flow passage 51 that liquid pressure acting on the inwardly tapered conical passage section 51a creates dynamic and static forces on the conical passage section 51a transverse to the central axis of the flow passageway for accentuating controlled pressure responsive deformation of the discharge orifice 52 such that a larger variation in liquid flow rates through the orifice member 50 can be affected with smaller changes in the liquid pressure.

Figure 12:
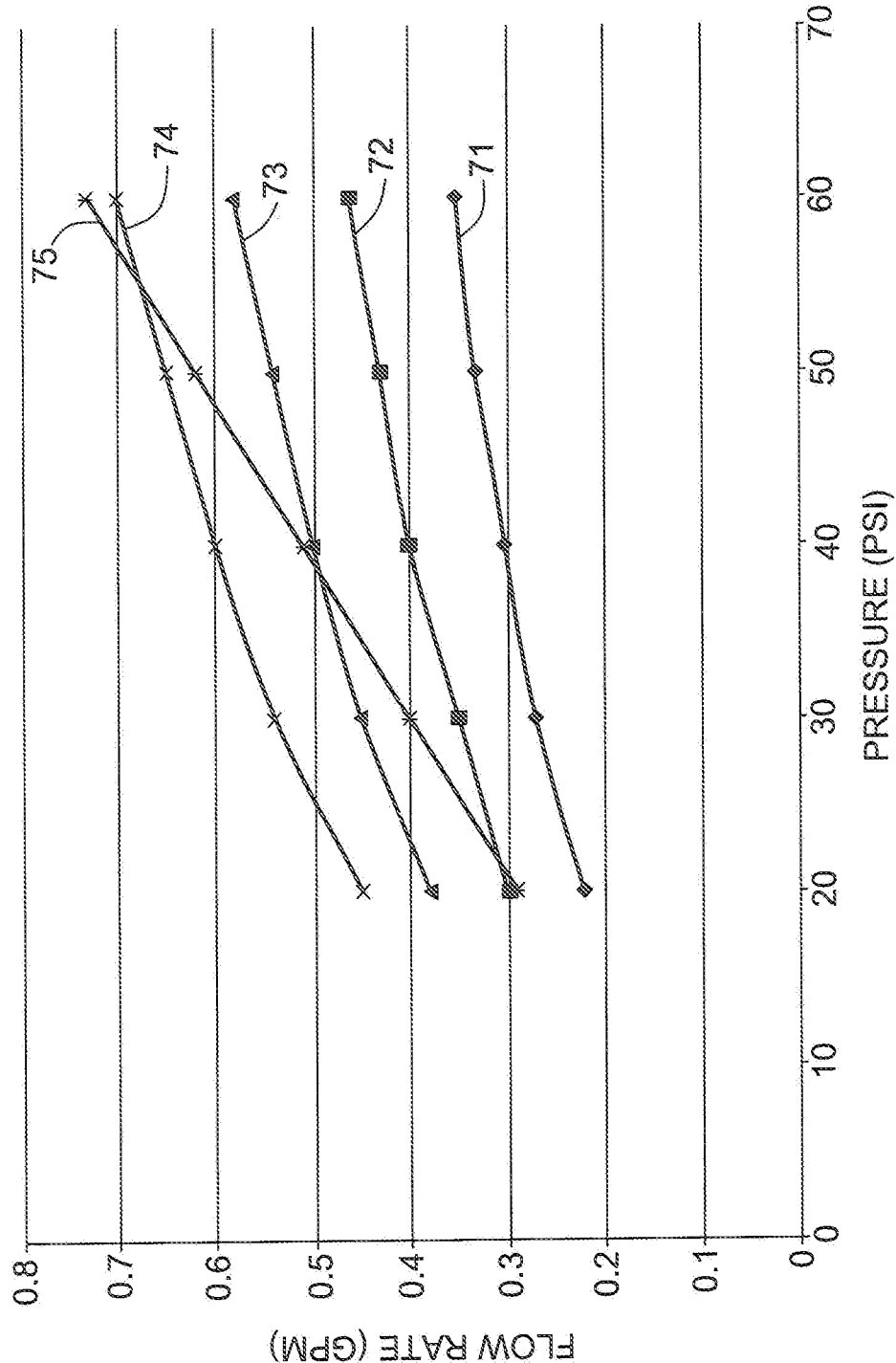
FIG. 12 is a depiction demonstrating the operating characteristics of the spray nozzle assembly in accordance with the invention in relation to prior art spray nozzle assemblies.

The surprising performance of the inventive spray nozzle assembly in relation to spray nozzles with fixed diameter orifice members or spray tips is depicted in FIG. 12. Lines 71-74 represent the changes in liquid flow rates through conventional plastic injection molded fixed discharge orifice spray tips having diameters 0.040 inches, 0.048 inches, 0.055 inches and 0.060 inches, respectively, sold by the assignee of the present invention under respective matter numbers SJ7-03, SJ7-04, SJ7-05, and SJ7-06, in relation to changes in liquid supply pressures between 20 and 60 PSI, pressures commonly used in agricultural spraying. The line 75, on the other hand, represents the change in flow rates over the same pressure range of a spray nozzle assembly with a resilient orifice member 50 with a discharge orifice 52 of 0.035 inches in accordance with the present invention. It can be seen that even with a smaller discharge orifice the flow rate through the inventive nozzle assembly 11 changes from less than 0.3 gallons per minute to 0.7 gallons per minute over the same change in liquid supply pressure. In other words, the subject spray nozzle assembly 11 enables changes in pressure responsive liquid flow rates comparable to at least three conventional spray tips or orifice members, as represented by lines 72-74. It will be appreciated by one skilled in the art that by virtue of such performance the subject spray nozzle assembly 11 has significant commercial ramifications in agricultural spraying since the same orifice member 50 can be used for achieving substantially greater changes in flow rates. In conventional practice, three different spray tips or orifice members would have to be utilized, requiring time consuming change in the multiplicity of spray nozzles on the liquid spray boom, as well as a greater inventory of spray tips and resulting carrying costs.

Figure 8A:
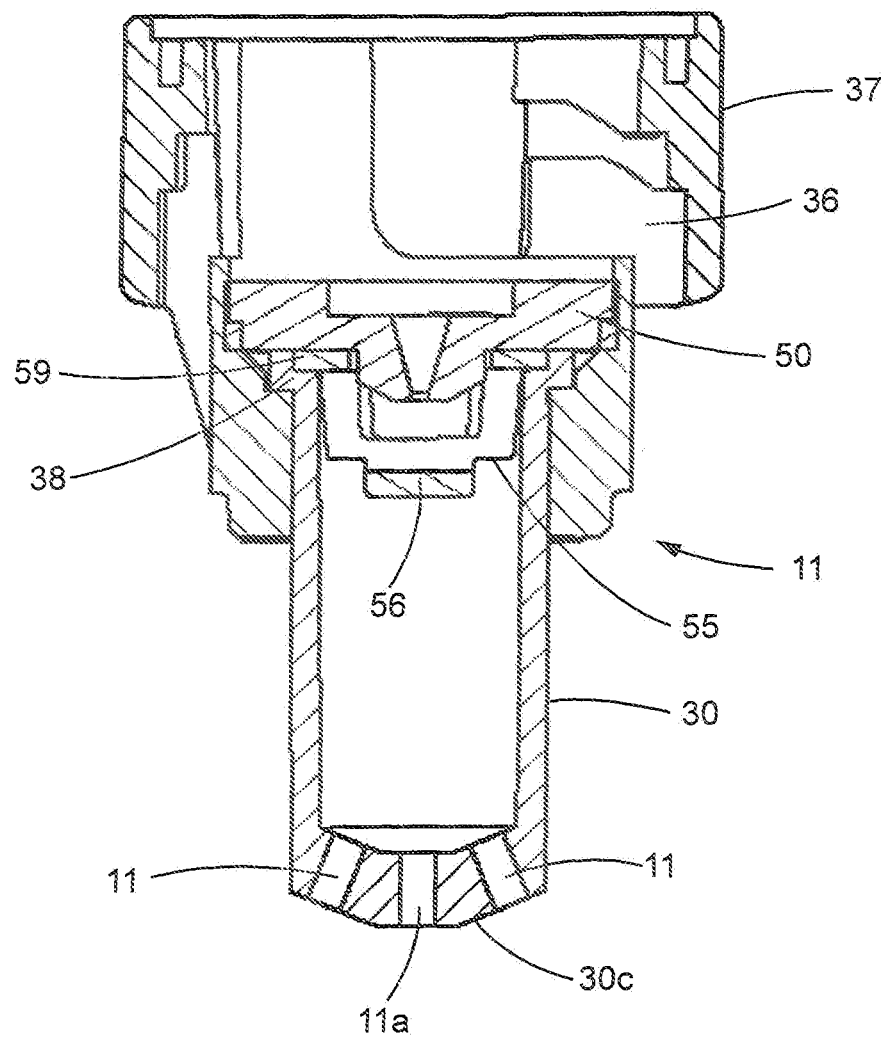
FIG. 8A is the vertical section of an alternative embodiment of the spray nozzle assembly in accordance with the invention.
Figure 9:
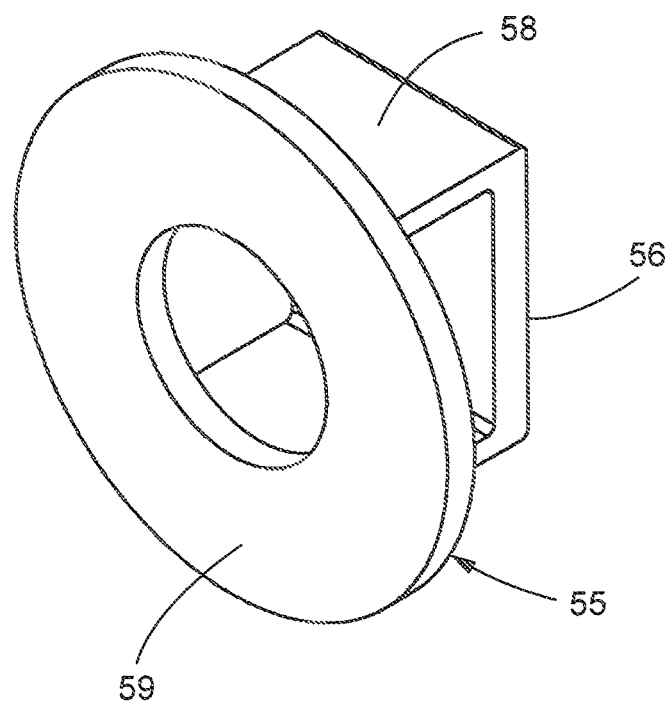
FIG. 9 is an enlarged perspective of the liquid impingement element of the illustrative spray nozzle assembly.

In a further alternative embodiment, as depicted in FIG. 8A, wherein items similar to those described above has been given similar reference numerals, the discharge orifices 11 are formed in a frustoconical end 30c of the nozzle body 30 for generating a conical spray pattern, together with one or more discharge orifices 11a extending downwardly through a downstream end of the nozzle body 30 parallel to a central axis thereof. The nozzle assembly 11 in this case has a quick disconnect mounting cap 37 separate from the nozzle body 30 having camming and locking grooves 36 for securing the nozzle body 30 to a liquid supply mounting stem having camming and locking lugs similar to that disclosed in the referenced U.S. Pat. No. 4,527,745. The upstream end of the nozzle body 30 in this case has an outwardly extending annular flange 38 for secured engagement by the mounting cap 37 with the annular mounting plate 59 of the impingement element 55 interposed therebetween. The orifice member 50 again serves the further purpose as a sealing element.

Figure 13:
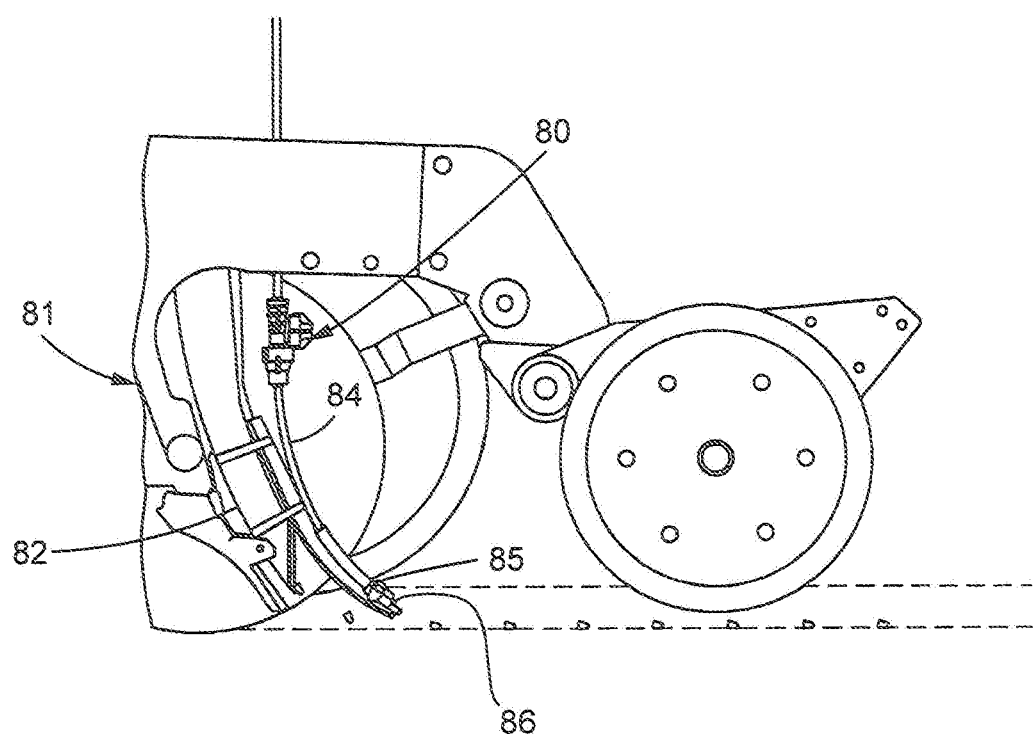
FIG. 13 is a side elevational view of a seed planter having a liquid directing spray nozzle assembly in accordance with an alternative embodiment of the invention.
Figure 14:
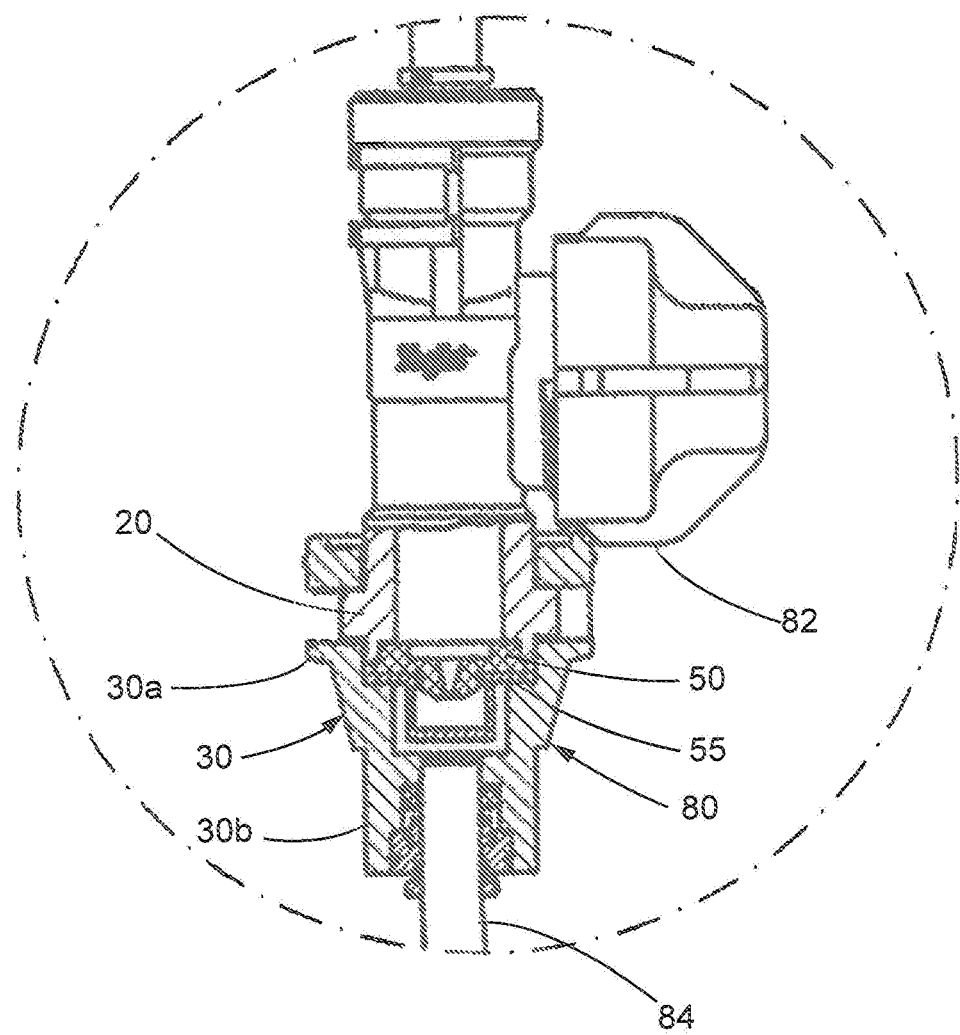
FIG. 14 is an enlarged fragmentary section of the spray nozzle assembly shown in FIG. 13.

Referring now to FIGS. 13 and 14 of the drawings, there is shown an alternative embodiment of the spray nozzle assembly 80 in accordance with the invention having particular utility in supplying liquid fertilizers simultaneously with agricultural seed planting wherever items similar to those described above have been given similar reference numerals. A conventional seed planter 81, as shown in FIG. 13 and will be understood by a person skilled in the art, can be drawn by a tractor through the field for simultaneously planting laterally spaced rows of seeds. While a single spray nozzle assembly is shown, it will be understood that seed planter includes a plurality of such liquid fertilizer spray nozzles along the transverse length of the seed planter. As is known in the art, the seed planter has a drop shoot 82 which distributes seeds at spaced locations along the row. Simultaneously, fertilizer is directed from the spray nozzle assembly 80 for application onto the seeded row. As indicated previously, it is necessary to direct predetermined quantities specific liquid fertilizers for particular seeding applications, and it is also necessary to control the liquid distribution rate based upon the moving speed of the seed planter. Heretofore, this has created problems, often necessitating time consuming and laborious changing of the plurality of spray nozzles or spray tips for the sprayer.

The spray nozzle assembly 80 in this case has a nozzle body 30 having an upstream liquid inlet and mounting section 30a and a downstream liquid distribution section 30b. The nozzle body 30 is supported on a mounting and liquid supply stem 20 which in this case receives liquid from a supply conduit by way of an anti-drip check valve 82 in a conventional manner, such as disclosed in U.S. Pat. No. 6,749,134 assigned to the same assignee as the present application, the disclosure of which is incorporated herein by reference. For quick disconnect coupling of the nozzle body 30 to the stem 20, the stem 20 and mounting section 30a of the nozzle body have quick disconnect coupling lugs and grooves, respectively, as described above.

The nozzle body 30 in this case has an open downstream liquid direction section 30b which receives an upstream end of a liquid conduit 84 in sealed and retained fashion, in the conventional manner, such as depicted in application Ser. No. 13/357,881, assigned to the same assignee as the present application. The liquid conduit 84 is open ended and supported at the downstream end 85 of the conduit 84 in a conventional manner, which in turn directs fertilizer, via a downstream spray tip 86, onto the seeds directly after they are planted.

In accordance with this embodiment of the invention, the spray nozzle assembly 80 has a resilient orifice member 50 and an impingement element 55 supported within the upstream inlet and mounting section 30a similar to that described above for atomizing liquid in a manner that enables a greater pressure response range of flow rates through the orifice member 50 as compared to orifice members and spray tips with fixed discharge orifices. Similar to the embodiment previously described, spray nozzle assembly 80 can be used over a wider range of feed rates than heretofore possible with such fixed diameter spray tips.

Figure 15:
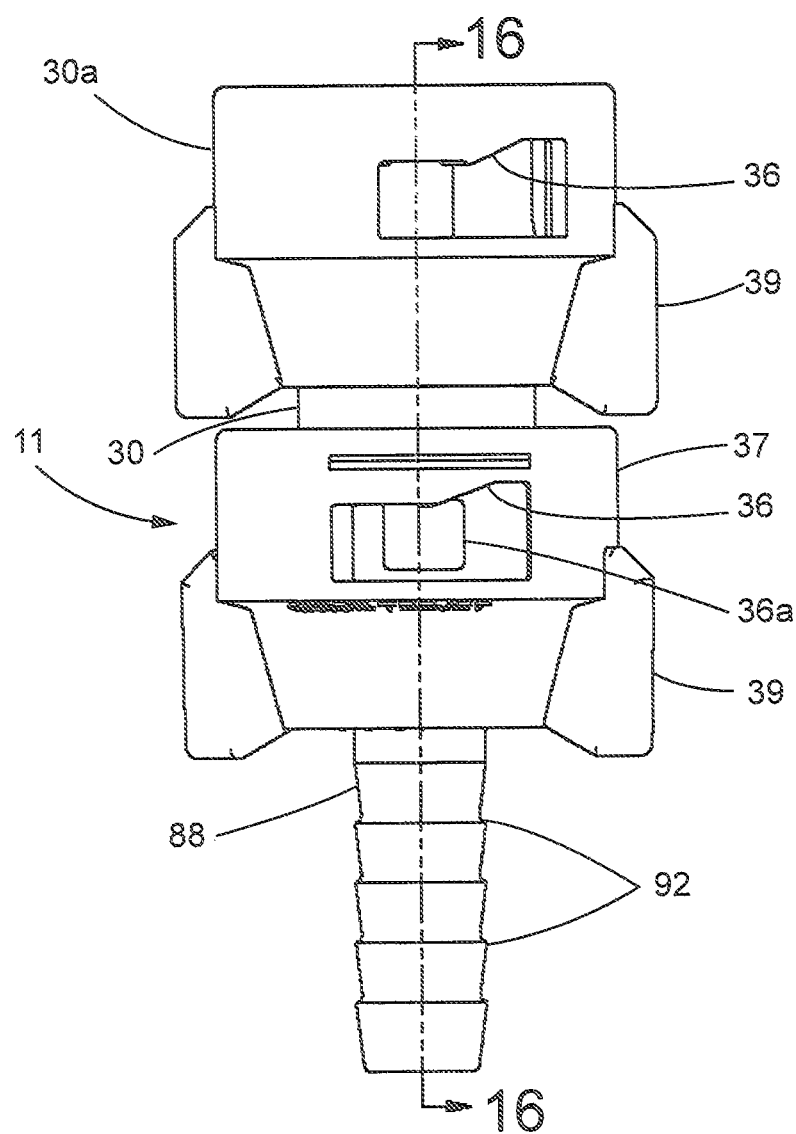
FIG. 15 is a side elevational view of another alternative embodiment of a spray nozzle assembly in accordance with the invention having a fluid conduit mounting stem affixed to a downstream end.
Figure 16:
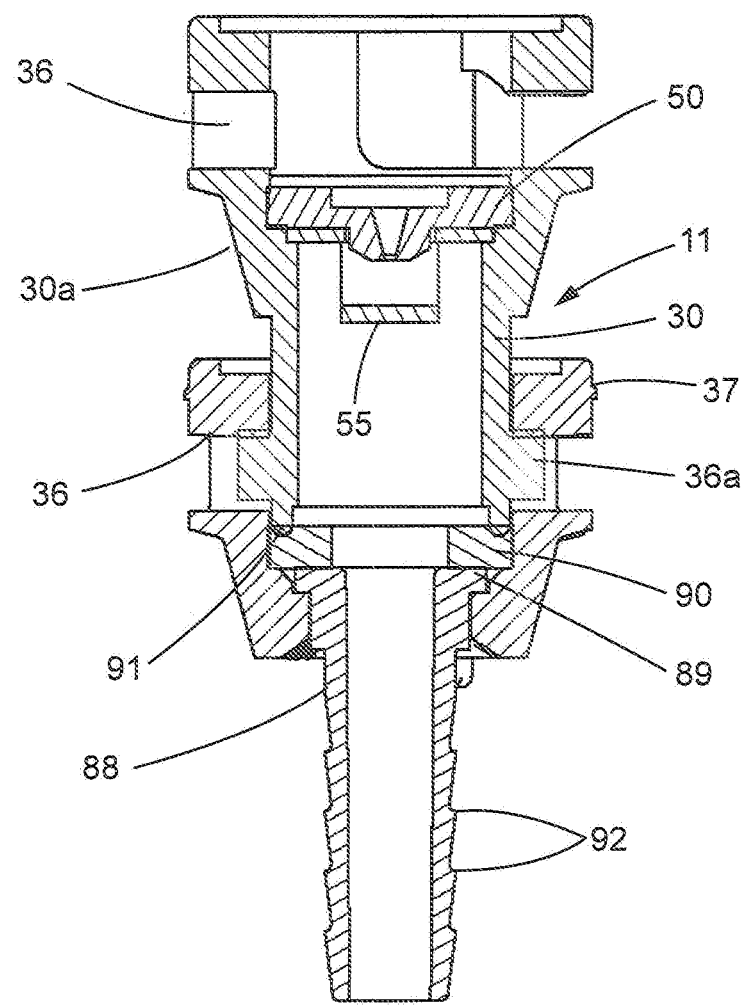
FIG. 16 is a vertical section of spray nozzle assembly shown in FIG. 15.

Referring now to FIGS. 15 and 16, there is shown another alternative embodiment of a spray nozzle assembly in accordance with the invention effective for directing atomized liquid to a liquid directing conduit, such as the liquid conduit 84 described above. Again, items similar to those described have been given similar reference numerals. The spray nozzle assembly in this case includes a nozzle body 30 having an orifice member 50 and impingement element 55 supported at an upstream end similar to that described above. Similar to the embodiment of FIG. 3, the nozzle body 30 has an integrally formed mounting section 30a at an upstream end formed with camming and locking grooves 36 for engagement with a liquid supply mounting stem as also described above.

Pursuant to this embodiment, the downstream end of the nozzle body 30 is coupled to a liquid conduit or hose mounting stem 88 by a quick disconnect cap 37, again having camming and locking grooves 36 for cooperation with camming and locking lugs 36a formed in outward radial relation to a downstream end of the nozzle body 30. The quick disconnect cap 36 is secured to the downstream end of the nozzle body 30 with an outer flange 89 of the stem 88 and an annular sealing member 90 interposed therebetween. The downstream end of the nozzle body 30 in this case is formed with a small diameter annular bead 91 for enhancing sealed engagement with the sealing member 90. The stem 88, typical of the prior art, has a barbed downstream end 92 over which a fluid conduit may be positioned and retained.

From the foregoing, it can be seen that a spray nozzle assembly is provided that is adapted for enabling a substantially greater range of liquid flow rates through the nozzle without changing the spray tip. The spray nozzle assembly is operable for effecting such changes in liquid flow rates and spray discharge outputs solely by changing the pressure of the supply liquid. The spray nozzle assembly has particular utility for directing selected variable quantities of agricultural chemicals including liquid fertilizers in conjunction with agricultural seed planting. Yet, the spray nozzle assembly is relatively simple in construction and lends itself to economical manufacture.

The invention claimed is:

1. An agricultural sprayer for spraying liquid agricultural chemicals in a controlled fashion based upon the pressure of the liquid agricultural chemical comprising:
   a tank of a selectively controllable pressurized supply of a liquid agricultural chemical; a tractor pullable elongated spray boom having a liquid supply conduit connected to said liquid chemical tank;
   a plurality of spray nozzle assemblies connected in laterally spaced relation along the length of said liquid supply conduit for receiving pressurized liquid agricultural chemical from said liquid agricultural chemical supply;
   said spray nozzle assemblies each having a nozzle body that defines a central liquid flow passageway having an upstream end communicating with said pressurized liquid agricultural chemical supply and a downstream end wall having at least one discharge orifice;
   an annular orifice member disposed within said nozzle body having a central liquid flow passage in fluid communication with said nozzle body central liquid flow passageway;
   said nozzle body defining an expansion chamber closed by said downstream end wall into which liquid from said liquid flow passage of the orifice member is discharged for direction from said at least one discharge orifice;
   said orifice member having an upstream cylindrical section and a downstream cylindrical hub, said upstream cylindrical section being larger in diameter than said cylindrical hub, said 2orifice member central liquid flow passage including a frustoconical passage section about ½ of which communicates through said upstream cylindrical section and about ½ of which communicates through said downstream hub, said frustoconical section tapered inwardly in a downstream direction that communicates with a discharge orifice of the orifice member at a terminal end of said hub for accelerating a flow of liquid directed through said orifice member from said liquid supply;
   said spray nozzle assemblies being supported in depending relation to said liquid supply conduit such that discharging liquid spray from said spray nozzles project downwardly onto a field along strips corresponding to the width of the spray boom as it is being pulled through the field by a tractor;
   said orifice member being made of a resilient and pressure responsive deformable material with said hub being freely expandable such that upon an increase in the pressure of the liquid agricultural chemical supply from 20 psi to 60 psi, said liquid flow passage and discharge orifice thereof can be altered to predictably increase the flow rate of the liquid agricultural chemical through said orifice member and said at least one nozzle body discharge orifice up to at least 75 percent at liquid flow rates of 0.3 to 0.7 gal. per minute; and
   upon interruption of the supply of pressurized liquid to the orifice member the orifice member liquid flow passage and discharge orifice return to their original shape.

2. The agricultural sprayer of claim 1 in which said orifice member passage includes an upstream cylindrical passage section in said upstream cylindrical section communicating with and having a diameter larger than an upstream end of said frustoconical passage section.

3. The agricultural sprayer of claim 1 in which said frustoconical passage section of said orifice member is formed with a conical angle between 20 and 40 degrees.

4. The agricultural sprayer of claim 1 in which said orifice member is made of ethylene polypropylene rubber, or fluorocarbon rubber.

5. The agricultural sprayer of claim 1 in which said downstream hub has an inwardly tapered frustoconical downstream end.

6. The agricultural sprayer of claim 5 in which said tapered frustoconical end of said hub has an axial length less than ½ the axial length of the hub from said upstream cylindrical section.

7. The agricultural sprayer of claim 1 in which the orifice member is made of an elastomeric material such that upon a controlled increase in pressurized liquid chemical supply to the orifice member from 20 to 60 psi the liquid flow through of the orifice member is increased by at least 130 percent.

8. The agricultural sprayer of claim 1 including an impingement element disposed in downstream relation to the discharge orifice of said orifice member against which a pressurized liquid chemical flow stream from said orifice member is directed for facilitating atomization of the liquid chemical, said impingement element being a centrally mounted plate supported in spaced apart opposed relation to the discharge orifice of said orifice member by legs extending from an upstream annular mounting plate disposed in surrounding relation to an upstream end of the cylindrical hub of said orifice member.

9. The agricultural sprayer of claim 8 in which said nozzle body defines an expansion chamber downstream of said impingement element having an axial length greater than the diameter of the expansion chamber.

10. The agricultural sprayer of claim 1 in which said nozzle body is supported in communication with said liquid chemical supply by an annular mounting stem, said mounting stem having a downstream annular bead, and said orifice member upstream cylindrical end forming a sealing gasket between said stem and said nozzle body.

11. An agricultural sprayer for spraying liquid agricultural chemicals in a controlled fashion based upon the pressure of the liquid agricultural chemical comprising:
- a tank of a selectively controllable pressurized supply of a liquid agricultural chemical;
- a tractor pullable elongated spray boom having a liquid supply conduit connected to said liquid chemical tank;
- a plurality of spray nozzle assemblies connected in laterally spaced relation along the length of said liquid supply conduit for receiving pressurized liquid agricultural chemical from said liquid agricultural chemical supply;
- said spray nozzle assemblies each having a nozzle body that defines a central liquid chemical flow passageway having an upstream end communicating with said pressurized liquid chemical supply and a downstream end wall having at least one discharge orifice;
- an annular orifice member disposed within said nozzle body having a central liquid flow passage in fluid communication with said nozzle body central liquid flow passageway;
- said nozzle body defining an expansion chamber closed by said downstream end wall into which liquid from said liquid flow passage of the orifice member is discharged for direction from said at least one discharge orifice;
- said orifice member having an upstream cylindrical section and a downstream cylindrical hub, said upstream cylindrical sections being larger in diameter than said cylindrical hub, said orifice member central liquid flow passage including a frustoconical passage section that communicates at least in part through both said upstream cylindrical section and downstream cylindrical hub and which has a frustoconical configuration inwardly tapered in a downstream direction at an angle of between 20 and 40 degrees that communicates with a discharge orifice of the orifice member at a terminal end of said hub for accelerating the flow of liquid chemical directed through said orifice member;
- said spray nozzle assemblies being supported in depending relation to said liquid supply conduit such that discharging liquid spray from said spray nozzles project downwardly onto a field along strips corresponding to the width of the spray boom as it is being pulled through the field by a tractor;
- said orifice member being made of a resilient and pressure responsive deformable material with said hub being freely expandable such that upon an increase in the pressure of the liquid agricultural chemical supply from 20 psi to 60 psi said liquid flow passage and discharge orifice thereof can be altered to predictably increase the flow rate of the liquid agricultural chemical through said orifice member and said at least one nozzle body discharge orifice up to at least 75 percent at liquid flow rates of 0.3 to 0.7 gal. per minute; and
- upon interruption of the supply of pressurized liquid to the orifice member the orifice member liquid flow passage and discharge orifice return to their original shape.

12. The agricultural sprayer of claim 1 in which said upstream cylindrical section has an axial thickness greater than the axial length of said downstream hub.

13. The agricultural sprayer of claim 8 in which said annular mounting plate of said impingement element surrounds said cylindrical hub adjacent an upstream end thereof.

14. The agricultural sprayer of claim 11 including an impingement element disposed in downstream relation to the discharge orifice of said orifice member against which a pressurized liquid flow stream from said orifice member is directed for facilitating atomization of the liquid, said impingement element being a centrally mounted plate supported in spaced apart opposed relation to the discharge orifice of said orifice member by legs extending from an upstream annular mounting plate disposed in surrounding relation to an upstream end of said hub.

15. The agricultural sprayer of claim 11 in which said upstream cylindrical section of said orifice member has an axial thickness greater than the axial length of said hub.

16. The agricultural sprayer of claim 1 in which said orifice member has a discharge orifice no bigger than 0.035 inches in diameter.

17. The agricultural sprayer of claim 11 in which said orifice member has a discharge orifice no bigger than 0.035 inches in diameter.

* * * * *